United States Patent [19]

Boles

[11] Patent Number: 5,506,584

[45] Date of Patent: Apr. 9, 1996

[54] RADAR SENSOR/PROCESSOR FOR INTELLIGENT VEHICLE HIGHWAY SYSTEMS

[75] Inventor: Sol Boles, Syosset, N.Y.

[73] Assignee: Northrop Grumman Corporation, Los Angeles, Calif.

[21] Appl. No.: 388,877

[22] Filed: Feb. 15, 1995

[51] Int. Cl.$^6$ ................................................ G01S 13/76
[52] U.S. Cl. ........................... 342/42; 342/44; 342/51; 340/825.34; 340/825.54
[58] Field of Search .................................. 342/42, 44, 50, 342/51; 340/825.54, 825.32, 825.34, 905; 364/443

[56] References Cited

U.S. PATENT DOCUMENTS

| | | | |
|---|---|---|---|
| 4,962,457 | 10/1990 | Chen | 364/443 |
| 5,347,456 | 9/1994 | Zhang et al. | 364/424.02 |
| 5,351,044 | 9/1994 | Mathur et al. | 340/901 |
| 5,381,155 | 1/1995 | Gerber | 342/104 |
| 5,387,916 | 2/1995 | Cohn | 342/44 |
| 5,416,711 | 5/1995 | Gran et al. | 364/436 |
| 5,424,727 | 6/1995 | Shieh | 340/928 |
| 5,425,032 | 6/1995 | Shloss et al. | 370/95.2 |

Primary Examiner—John B. Sotomayor
Attorney, Agent, or Firm—Terry J. Anderson; Karl J. Hoch, Jr.

[57] ABSTRACT

A radar sensor/processor for intelligent vehicle highway systems. The radar sensor/processor provides the range, speed, identity of, and selective communications with, vehicles equipped with a transponder in a first cooperative interrogator/transponder mode, and provides information on the range and speed of vehicles without a, or with an inoperative, transponder in a second noncooperative mode. The interrogator includes a first direct digital synthesizer, with an associated first input binary tune register, for producing a sine wave output, a multiplier for multiplying the sine wave output to produce an X-band signal, and a bi-phase single sideband modulator which modulates the X-band signal with data to be transmitted. The interrogator receiver receives a returned transponder reply signal, and includes a balanced mixer for downconverting the reply signal. A down-converted carrier signal is extracted, and is an input to a control loop which includes a second direct digital synthesizer, its associated second input binary tune register, a phase detector, and an A/D converter. The control loop rapidly adjusts the count in the second binary tune register to bring the output frequency of the second direct digital synthesizer into exact correspondence with the down-converted carrier signal. A subtraction of the respective counts in the input binary tune registers for the first and second direct digital synthesizers is a measure of the vehicle speed.

12 Claims, 4 Drawing Sheets

TRANSPONDER REPLY FORMAT

TIME LINE

RADAR SENSOR/PROCESSOR FOR INTELLIGENT VEHICLE HIGHWAY SYSTEMS

BACKGROUND OF THE INVENTION

1. Field of the Invention

The present invention relates generally to a radar sensor/processor for intelligent vehicle highway systems, and more particularly pertains to a radar sensor/processor for Intelligent Vehicle Highway Systems (IVHS) as promulgated by the Federal Highway Administration, Department of Transportation.

2. Discussion of the Prior Art

There are well in excess of one hundred million vehicles licensed to operate on the highways of the United States, and it has been estimated that at any one time in excess of one hundred thousand vehicles may be wanted for investigation for a variety of reasons. They may have outstanding tickets or violations, exceeded established speed limits, be operating with expired or stolen license plates, or have been at the scene of one or more of many criminal activities. At the present time, license numbers of vehicles wanted for investigation are distributed to local police who, with reference to printed or computerized lists, scan traffic visually encountered in the course of their normal duties. Their task is complicated by the fact that, on a busy multi-lane highway, many different cars constantly pass a given observation point. As a consequence, the probability of intercepting a wanted vehicle is very low.

Attempts have been made in the prior art to automate the surveillance by equipping each vehicle with a transponder device that responds to an interrogation signal by emitting a code that is unique to each vehicle. These interrogation responses are to be presented to an operator who no longer would have to rely on visual observation. These prior art approaches have failed because of the high density of vehicles on highways, particularly suburban areas, and because of the sheer volume of data that is presented to the human observer. For example, on a major highway there can be many more than ninety vehicles within one-half mile of in interrogation device and in a multi-lane environment, many of them will be at the same or nearly the same range and at the same or nearly the same relative velocity with respect to the interrogation device. It has, therefore, not been possible to discriminate the vehicles on the basis of two way signal transit time (radar time) or on the basis of doppler frequency difference. The response codes become hopelessly interleaved, and many vehicles are either not identified it all or are misidentified.

Spiess U.S. Pat. No. 5,264,854 discloses a multiple vehicle identification and classification system which reduces the response rate of the transponder-equipped vehicles by a large factor. The system randomizes in time the responses from a particular vehicle to reduce transponder code interleaving to a negligible level, while retaining the vehicle identification, speed and range information of the data stream. The transponder devices may respond to an interrogation pulse or run free on a randomized basis whenever they are illuminated.

The system utilizes a transponder device the coded responses of which are randomized in time and an interrogation device which processes the return signals to provide vehicle identification, speed, location, and transponder status information on vehicles to an operator, or for storage in memory, or for transmittal to a higher authority.

SUMMARY OF THE INVENTION

Accordingly, it is a primary object of the present invention to provide a radar sensor/processor for intelligent vehicle highway systems.

The system of the present invention operates in both a cooperative (interrogator/transponder) mode and a non-cooperative mode, measures vehicle range and speed or velocity in both modes, and has the capability in the cooperative mode of ascertaining vehicle ID and providing two-way communication.

A further object of the subject invention is the provision of specific designs for radio frequency (RF) and digital circuits, including associated software codes, for a radar sensor/processor to provide the range, speed and identity of a vehicle equipped with a transponder in a cooperative interrogator/transponder mode. The system and the radar sensor/processor must operate over extended lengths of highway in extremely dense vehicle environments in which vehicle speeds may be essentially the same and the ranges of several vehicles substantially identical. The present invention provides for two-way digital communication between such moving vehicles and a fixed interrogator, and simultaneously, in a non-cooperative passive mode, provides information on the range and speed of those vehicles whose speed lies beyond the normal range of general traffic, using the same RF frequencies and hardware for both modes of operation.

Operation at X-band has been selected for relative ease in component selection and because it provides a sufficiently high Doppler constant (i.e., hertz per ft/sec. vehicle velocity) to accurately measure velocity. The system uses known existing antenna elements, a waveguide fed dish for the interrogator, and a quarter wave monopole antenna flush mounted to the roof of the vehicle, which serves as the transponder radiating element with near isotropic coverage in the horizontal plane.

The present invention is directed towards meeting the stated goals of the U.S. Department of Transportation's Intelligent Vehicles Highway System (IVHS) of:

a) improving the safety of surface transportation;

b) increasing the capacity and operational efficiency of the surface transportation system;

c) enhancing personal mobility and the convenience and comfort of the surface transportation system; and d) reducing the enviromental and energy impacts of surface transportation.

To meet these goals, a radar sensor/processor is provided which is capable of operating in both 1) a cooperative active mode in which a transponder in each vehicle responds to interrogations issued by an interrogator at a fixed location, and 2) a noncooperative passive mode based upon vehicle reflections of RF energy issued by the interrogator from those vehicles not equipped with a transponder or those vehicles with an inoperative transponder. Such a system is capable of economically and continuously monitoring extended lengths of critical highways and intersections, and in the cooperative active mode of providing two-way communications between transponder equipped vehicles and a central interrogator and determining the vehicle identification number (VIN) of a vehicle, and also of providing vehicle range and speed in both cooperative and non-cooperative modes.

The advantages of the present invention over presently known prior art devices are:

The interrogator/transponder design continuously measures vehicle range, speed, and identity over extended lengths of highway in extremely dense vehicle environments wherein vehicle speeds may be essentially the same and the ranges of several vehicles substantially identical. The system also provides two-way digital communication with transponder equipped vehicles using the same RF frequencies and hardware.

In the passive mode, the system has the capability of measuring the range and speed of vehicles whose speed lies beyond the normal range of general traffic.

The present invention also has the capability of mitigating against fading effects caused by road multipath reflections in both modes by utilizing first and second vertically displaced receiving systems, and then by selecting and processing the selection of the stronger of the two return signals.

In accordance with the teachings herein, the present invention provides a transportation communication system between an interrogator and vehicles equipped with a transponder. The interrogator includes a first direct digital synthesizer, with an associated first input binary tune register, for producing a sine wave output. A multiplier multiplies the sine wave output to produce an X-band signal, and a modulator modulates the X-band signal with data to be transmitted to produce an interrogator carrier signal which is directed to an antenna for broadcast. A transponder in a vehicle receives the broadcast signal and returns a transponder reply signal in response thereto. The interrogator antenna receives the transponder reply signal which is processed in an interrogator receiver. The receiver includes a balanced mixer for downconverting the transponder reply signal. The output of the mixer includes the down-converted Doppler shifted carrier frequency, and a processing circuit produces just the down-converted carrier signal, which is an input to a control loop. The control loop includes a second direct digital synthesizer, its associated second input binary tune register, a phase detector receiving the down-converted carrier signal, and an analog to digital converter. The control loop rapidly adjusts the count in the second binary tune register to bring the output frequency of the second direct digital synthesizer into exact correspondence with the down-converted carrier signal. A subtraction circuit subtracts the respective counts in the input binary tune registers for the first and second direct digital synthesizers, which is a measure of the two way Doppler shift and vehicle speed.

In greater detail, the interrogator includes first and second vertically spaced receiving systems, and the stronger of the two return signals is selected to mitigate against fading effects caused by road multipath reflections. The interrogator also includes a processor for producing coded data to be transmitted, which is directed to the modulator. The modulator comprises a bi-phase modulator wherein the coded data is bi-phase shift key modulated onto the sine wave output, and a single sideband modulator which combines the output of the bi-phase modulator and the X-band signal. The interrogator also includes a stable clock which drives the first direct digital synthesizer. The stable clock frequency samples the binary count in the input binary tune register at each clock pulse, and places the count in a digital phase accumulator which overflows when its n bits are full. The length of time for the accumulator to overflow determines the period of one sine wave cycle, and thereby the resultant output frequency of the first direct digital synthesizer. The interrogator further includes a bandpass filter which filters the output of the single sideband modulator to remove sidebands generated in the modulation process. The processing circuit includes a series arrangement of a multiplier circuit, a filter circuit, and a division circuit, which strips the bi-phase shift key modulation while producing only the down-converted carrier signal. The control loop also includes a low pass filter between the output of the phase detector and the input to the analog to digital converter, The control loop is designed to be sufficiently fast to support loop closure in a fraction of a chip width, and the bandwidth of the low pass filter is selected to support loop closure in substantially less time than one pulse repetition interval.

The transponder includes an antenna, a mixer, receiving the outputs of the antenna and a local oscillator, for down-converting the received signal to produce an input for a Costas demodulator loop, which replicates the suppressed interrogator carrier frequency and also demodulates the hi-polar video baseband demodulation. The arrangement includes an upconverter coupled to the local oscillator for upconverting the carrier lock frequency of the Costas demodulator loop to produce the same carrier frequency as the carrier entering the transponder, a bi-phase modulator for bi-phase modulating the output of a crystal oscillator with a desired transponder reply, and a single sideband modulator. The transponder antenna transmits the resulting bi-phase shift key single sideband signal back to the interrogator.

The output of the balanced mixer also includes bi-polar video representing the coded transponder reply message which is directed to a coherent phase detector, along with the output of the second direct digital synthesizer, for synchronous demodulation of the output of the balanced mixer. The output thereof is directed to a bit synchronizer for bit synchronization, after which the bi-polar video is read as a corresponding stream of binary ones and zeros. For a range measurement, a clock signal from the first direct digital synthesizer is directed to the processor to produce a count proportional to vehicle round trip delay and vehicle range.

In preferred embodiments, in the interrogator, the stable clock operates at a nominal frequency of 500–600 MHz, the direct digital synthesizer operates at a nominal frequency of 100–200 MHz, the multiplier operates at a nominal frequency of 8–9 GHz, and after the single sideband modulation, the interrogator carrier signal operates at a nominal frequency of 8–9 GHz. In the transponder, the local oscillator operates at approximately 8–9 GHz to produce an input of approximately 100–200 MHz for the Costas demodulator, and the crystal oscillator operates at approximately 100–200 MHz.

BRIEF DESCRIPTION OF THE DRAWINGS

The foregoing objects and advantages of the present invention for a radar sensor/processor for an intelligent vehicle highway system may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
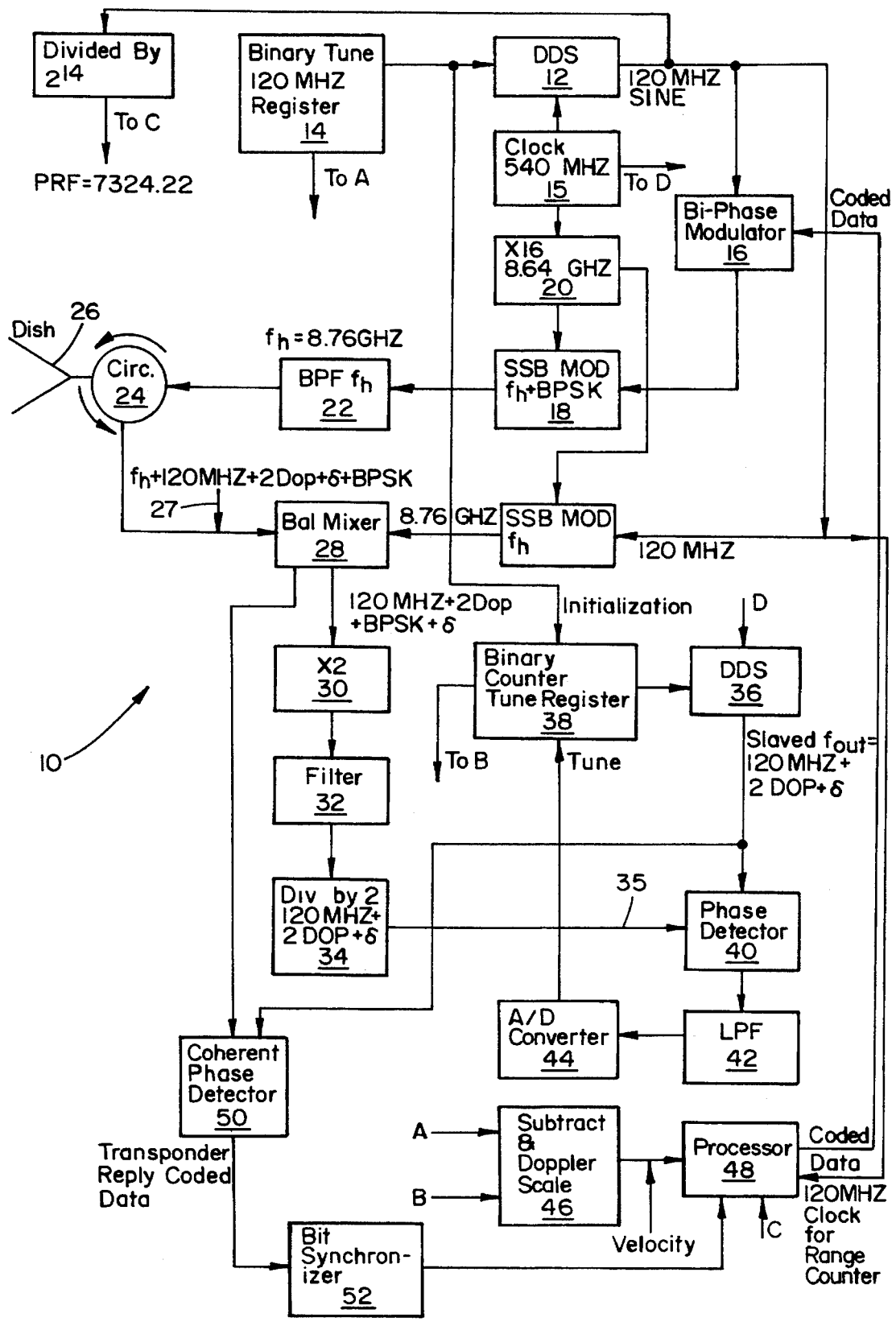
FIG. 1 is an elevational view of an exemplary embodiment of a radar sensor/processor for IVHS constructed pursuant to the teachings of the present invention.

Referring to the drawings in detail, FIG. 1 is a fairly detailed block diagram of an interrogator 10 constructed pursuant to the teachings of the present invention. The frequency source of the interrogator 10 is a direct digital synthesizer (DDS) 12, the frequency of whose synthesized output sinewave is determined by a binary number applied by an input binary tune register 14 of the DDS 12. A stable clock 15 frequency samples the binary count at each pulse repetition interval (clock pulse), and places the count in a digital phase accumulator which overflows when its N bits are full. The length of time for the accumulator to overflow determines the period of one sine wave cycle, and hence determines the resultant output frequency. The response of this loop to a change in input binary count could be made virtually instantaneous. Coded data (from the interrogator processor 48) to be transmitted is bi-phased modulated onto the 120 MHz output frequency of the DDS 12. The bi-phase shift keyed (BPSK) signal is inputted to a single sideband modulator 18 (SSB MOD) wherein it is combined with a ×16 multiplication of the 540 MHz DDS clock frequency (8.64 GHz) from 20 to produce an 8.76 GHz BPSK microwave signal which is band pass filtered in BPF 22 to remove sidebands generated in the modulation process. The filtered signal from 22 is passed through a circulator duplexer 24, and is subsequently radiated by a parabolic dish antenna 26. In summary, the clock frequency driving the DDS 12 is multiplied at 20 up to X-Band (8 GHz), and is subsequently single sidebanded at 18 by the BPSK modulated, 120 MHz reference, filtered at 22 and radiated at 26 as a microwave signal.

The signal returned from a vehicle transponder 60 (FIG. 2) at 27 is the interrogator carrier, $f_n$, upconverted 120 MHz by a crystal oscillator (70, FIG. 2) in the transponder 60, the BPSK signal modulated with its own message, plus twice a one-way Doppler shift caused by vehicle motion. Upon entering the interrogator receiver, the BPSK modulated transponder reply is downconverted in a balanced mixer 28 to a carrier frequency, 120 MHz+2 Dop+BPSK +δ. A frequency error 6 is shown which represents the error in the transponder crystal frequency from 120 MHz, which ultimately appears as an error in vehicle velocity or speed estimation. Inexpensively priced commercially available crystal oscillators are available with a long term frequency stability of 1 part in $10^7$. This translates into a maximum vehicle velocity error at X-band of 0.46 mph, which is considered quite tolerable for this application.

The desired outputs of the balanced modulator 28 are (1) the down-converted Doppler shifted carrier frequency, which is used to determine the vehicle speed or velocity, and (2) the demodulated bi-polar video representing the transponder reply message. The first is determined by a ×2 multiply at 30, filtering at 32, and a divide by 2 at 34. This processing strips the BPSK modulation while producing the desired downconverted carrier, which persists only for the duration of the transponder reply.

This frequency is inputted at 35 to a control loop comprised of another direct digital synthesizer (DDS) 36, its associated binary input turning register 38, a phase detector 40, low pass filter (LPF) 42, and an analog to digital (A/D) converter 44, to quickly adjust the count in the binary register 38 to bring the reconstituted down-converted transponder reply carrier frequency into exact correspondence with the output frequency of the DDS 36. When correspondence occurs, a digital subtraction at 46 between the respective counts in the binary registers associated with both DDS devices is a measure of the two way Doppler shift, and hence vehicle velocity or speed after appropriate Doppler scaling, which is an input to the interrogator processor 48.

The loop is designed sufficiently fast to support loop closure in a fraction of a chip width. The bandwidth of the LPF 42 is adjusted to support loop closure in substantially less time than one pulse repetition interval (PRI).

Bi-polar video representing the coded transponder reply is produced from the synchronous demodulation of the output of the balanced mixer 28 by the reconstituted, settled and filtered sample of the down-converted, transponder carrier from the DDS at a coherent phase detector 50.

The bi-polar video is read into a corresponding stream of binary ones and zeros after bit synchronization is established in a bit synchronizer 52 and conventional integrate and dump circuitry. For range measurement, a 120 MHz clock signal from the reference DDS is inputted to the processor 48 to produce a count proportional to vehicle round trip delay and hence vehicle range. Range quantization error associated with this process is about 1.7 feet. In this manner, each interrogator PRI, if occupied by a properly ID'd vehicle transponder reply, is processed for vehicle range, velocity, and message.

Figure 2:
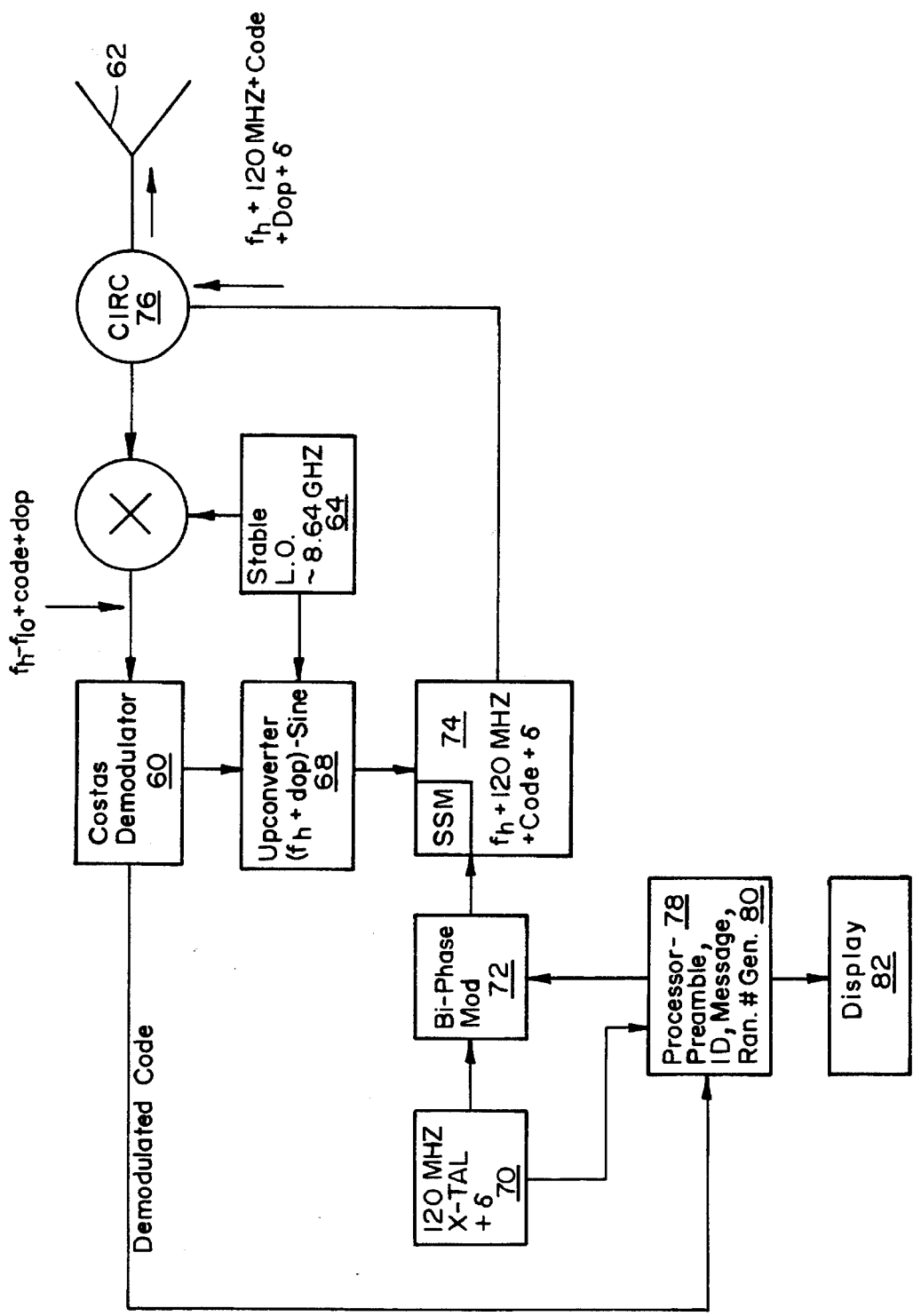
FIG. 2 illustrates a block diagram of a transponder constructed pursuant to the teachings of the present invention.

FIG. 2 illustrates a block diagram of a transponder 60 constructed pursuant to the teachings of the present invention. The transponder antenna 62 is preferably a short monopole antenna with omnidirectional coverage mounted to the roof of a vehicle. The BPSK modulated interrogator signal is down-converted by a stable local oscillator 64 operating at approximately 8 GHz (8.64 GHz) to produce an input of about 120 MHz for a Costas demodulator 66. A bi-phase coded modulation of a carrier results in a double-sideband modulation structure with a suppressed carrier. An ordinary phase locked loop will not reconstruct the carrier so as to preserve coherence around the loop to the interrogator for Doppler measurement. In contrast thereto, the Costas demodulator 66 replicates the carrier frequency, and at the same time produces bi-polar video baseband demodulation. The carrier lock frequency of the Costas loop is upconverted at 68 by the same stable LO 64 to produce the same carrier frequency value as that entering the transponder 60 (although suppressed). A 120 MHz crystal oscillator 70, suitably bi-phase modulated at 72 in accordance with the desired transponder reply, further upconverts the replicated $f_n$ Dop in a single sideband modulator 74, and radiates the resulting BPSK SSB structure ($f_n$+120 MHz+Dop+δ) through a circulator duplexer 76 and antenna 62 back to the interrogator 10 (FIG. 1).

According to an adopted vehicle retransmission scheme, each vehicle transponder carries a random number generator (RNG) 80 in its processor 78. Upon interrogation, the RNG 80 randomly selects one of a prescribed number of PRI's in which to transpond. After each transponder response, the random PRI selection process is repeated. In this manner, in a multiple vehicle environment, and with the stated transponder reply protocol, a uniform distribution of responses is achieved and any synchronization of vehicle responses one with the other is avoided. In a dense traffic environment of 750 vehicle and for chosen parameters, a sample rate of 3.6 messages per second, on the average, is achievable for each vehicle. Each vehicle transponder transmits once every 1000 interrogations, periodically determined by a random number generator in each transponder processor 78. Vehicle retransmission can also be accomplished with other retransmission formats, such as by time-division multiplexing.

Although not shown in the block diagrams of FIGS. 1 and 2, amplifiers and filters are included throughout in order to provide suitable signal and power levels at all points and to produce at least 60 db of suppression of all unwanted modulation byproducts.

Figure 3:
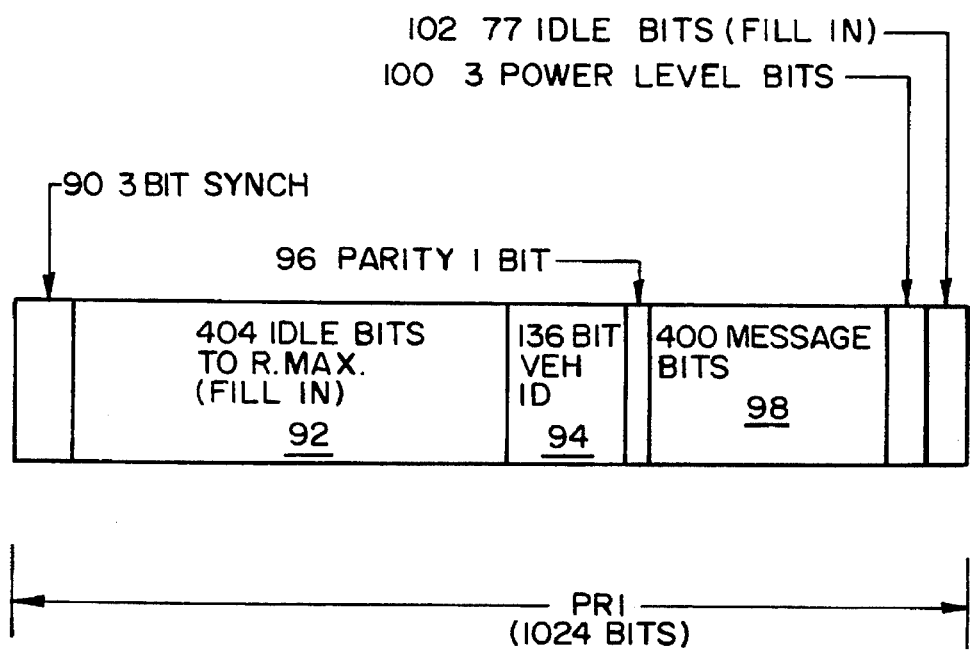
FIG. 3 illustrates time lines for the interrogator and the transponder.
Figure 3:
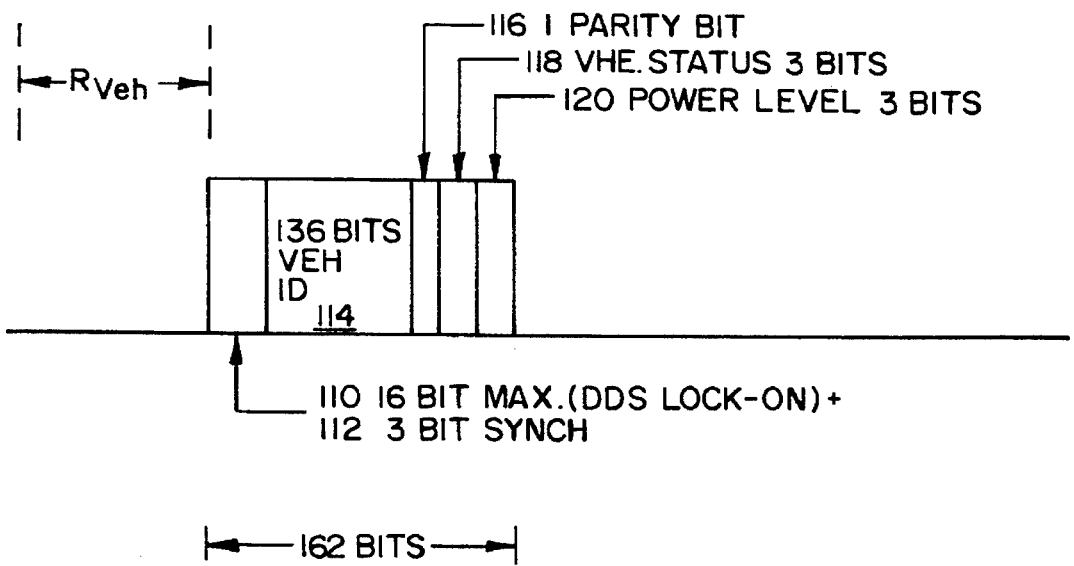

FIG. 3 illustrates time lines for the interrogator 10 and transponder 60. Initially, the system pulse repetition frequency (PRF) is selected by dividing the 120 MHz DDS reference frequency in an interrogator 10 by $2^{14}$, resulting in a PRF of 7324.21875 Hz. The chip rate is selected by dividing the 120 MHz frequency reference by $2^4$=7.5 MHz. The corresponding chip width is then 0.13333 usec. A total of 1024 chips (or bits) can therefore be generated in a pulse repetition interval (PRI).

A 3 bit synchronous word at 90 is chosen in the Interrogator to provide bit synchronization (t=0 in the bit stream) when detected at the transponder 60 the bit synchronization is required because the Costas loop in the transponder 60 and the frequency doubler/divider/demodulator in the interrogator 10 receiver both have a potential 180° phase ambiguity. In ether case, the demodulated bit stream could be the same for an input baseband modulation of −m(t) instead of the assumed +m(t). The imbedded bit word resolves this potential ambiguity.

Following the 3 bit synchronous word, 404 idle bit positions are available at 92 to accommodate 162 bits of transponder 60 reply to a maximum range of 3 miles. At this point, a message can be transmitted to a vehicle. Vehicle identification is in accordance with a 17 character vehicle identification number (VIN), which reduces to 136 bits using an ASCII formalism of 8 bits per character. Vehicle identification at 94 is followed by a single bit for parity check at 96 and then by a 50 character message at 98, which at 8 bits per character translates to 400 additional bits. Three additional bits are included at 100 for power level adjustment, Leaving 77 idle bit positions at 102 before the end of the PRI.

The transponder 60 reply formed has a 16 bit preamble at 110 to allow sufficient time for DDS lock-on in the interrogator receiver, a 3 bit synchronous word at 112, a 136 bit VIN at 114, parity bit at 116, 3 status bits at 118 (for example, "out of gas," "disabled" or "medical problem") and 3 power level bits at 120, totaling 162 bits.

The two intervals of 404 and 77 idle bit positions are filled with BPSK modulation to avoid possible settling time problems in the transponder Costas loop due to phase lock interruptions by the two intervals of idle bits in the interrogator PRI timeline, so that the Costas loop in each vehicle transponder remains continuously locked, since it will see a (bi-phase shift coded) CW transmission. Also, one or both of these filled-in modulation intervals can be used in a passive mode for those vehicles not equipped with an operating transponder.

Figure 4:
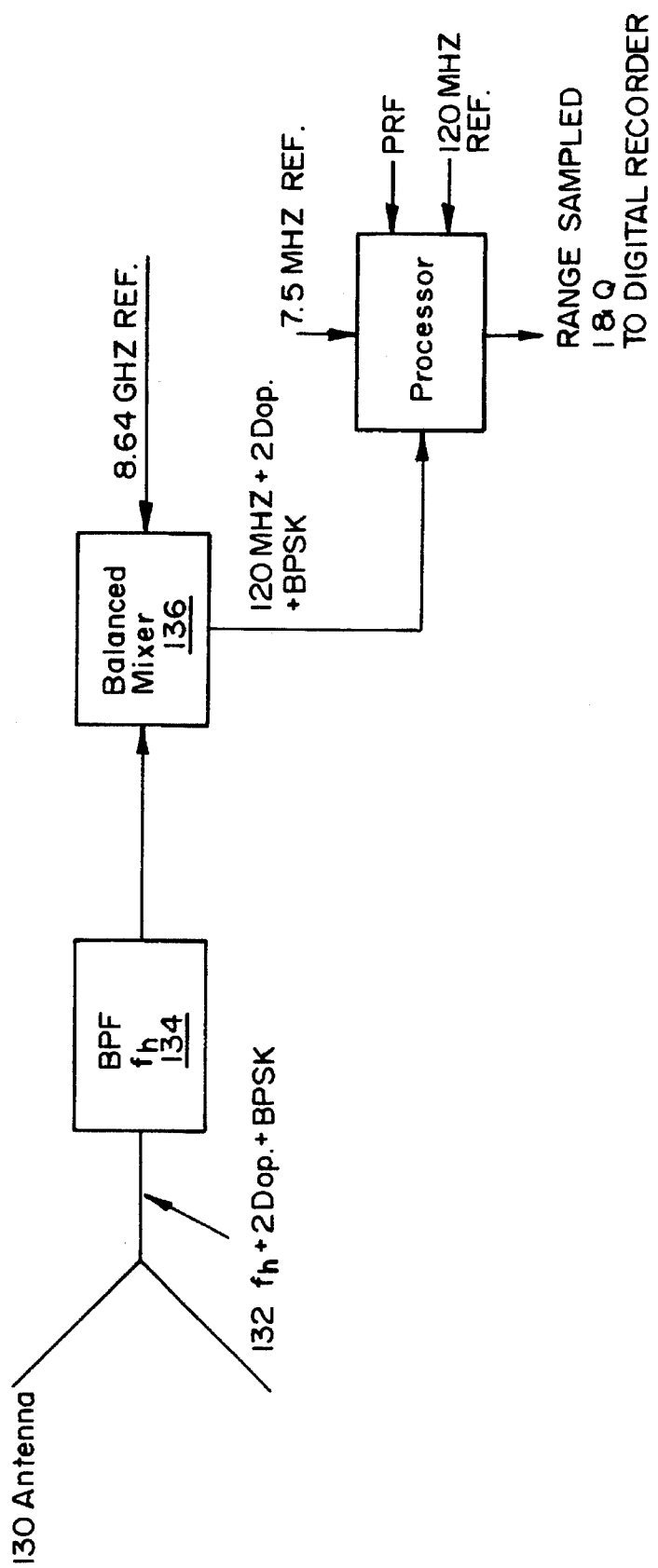
FIG. 4 illustrates the implementation of the second passive, skin track mode.

FIG. 4 illustrates the implementation of the passive mode as follows. A second small dish antenna 130 is used for skin track reception at the Interrogator installation and tuned to a band about $f_h$. Isolation between the transmitting antenna 26 and the passive receiving antenna 130 should be 60 db or better to avoid problems due to strong leakage levels. The second small dish antenna 130 is used for passive mode reception, and is tuned to a band about $f_h$. At a horizontal spacing of about 6 feet, the isolation between the transmitting antenna 26 and the passive receiving antenna 130 is 60 db or better. This avoids problems caused by strong leakage levels.

The vehicle return appears at the interrogator at frequency $f_h$ (8.76 GHZ), as indicated at 132 in FIG. 4, with twice the one-way Doppler shift and contains the transmitted PBSK code. This reflected signal is bandpass filtered at 134 to reject strong vehicle transponder returns, and inputted to a balanced mixer 136, which also receives a sample of the 8.64 GHz frequency reference from the interrogator. The output of the balanced mixer 136 is at 120 MHZ +2 Dop and BPSK, which contains the two way Doppler shift due to vehicle motion. This output is I and Q down converted by the interrogator 120 MHz coherent reference and both are subsequently range sampled at the 7.5 MHz chip rate providing =65 ft of range sampled resolution. This mode is intended to detect a vehicle moving at excessive speed with respect to the remaining population of vehicles, rather than determining speeds and locations of all vehicles in the scene. As an example, a 128 point FFT requires an integration time of 128/PRF=128/7324+0.0175 sec, resulting in a Doppler resolution filter bandwidth of 57.2 hertz. Based on a Doppler constant of 16.5 hertz per ft. per second speed, a filter resolution of 3.5 ft/sec, or 2.4 mph results, considered adequate for this purpose. The use of filter interpolation would substantially improve velocity resolution. A vehicle traveling at 100 mph subtends a range extent of <3 ft during one integration interval which is safely within a range bin and keeps the processing simple.

The reflected return is heterodyned down in the interrogator to the 120 MHz frequency level with a coherent sample of the 8.64 GHz reference frequency. If the idle 404 bits in the interrogator PRI is filled with a bi-phase code of 255 bits possessing good range sidelobe properties, then a filter matched to this code produces pulse compressed passive mode returns with an ultimate range resolution of a single chip width of about 65 ft. The filter can be in the form of a bank of 255 contiguous shift registers, whose multiplicative weights (±1) before summation are chosen to correspond to the code chosen for transmission. The resulting compressed range responses over a band of contiguous PRI's (i.e., 128) are I and Q demodulated down to Doppler baseband, A/D sampled, stored in memory, and then Fourier transformed for vehicle frequency, hence velocity, determination.

Fading effects due to road multipath reflections in both cooperative and non-cooperative modes may be mitigated against by the judicious location of a second receiving system at the interrogator station, vertically disposed from the first receiving system, and the stronger of the two return signals is selected for processing.

While several embodiments and variations of the present invention for a radar sensor/processor for Intelligent Vehicle Highway Systems are described in detail herein, it should be apparent that the disclosure and teachings of the present invention will suggest many alternative designs to those skilled in the art. For instance, the system may be readily implemented for air traffic control.

What is claimed is:

1. A transportation communication system between an interrogator and a vehicle equipped with a transponder, comprising an interrogator having a first direct digital synthesizer, with an associated first input binary tune register, for producing a sine wave output, a multiplier for multiplying the sine wave output to produce an X-band signal, a modulator for modulating the X-band signal with data to be transmitted to produce an interrogator carrier signal which is directed to an antenna for broadcast, a transponder in the vehicle for receiving the broadcast signal and returning a transponder reply signal in response thereto, the antenna receives and directs the transponder reply signal to an interrogator receiver, which includes a balanced mixer for downconverting the transponder reply signal, the output of which includes the down-converted Doppler shifted carrier frequency, and a processing circuit produces a down-converted carrier signal, which is an input to a control loop comprised of a second direct digital synthesizer, its associated second input binary tune register, a phase detector receiving the down-converted carrier signal, and an analog to digital converter, to rapidly adjust the count in the second binary tune register to bring the output frequency of the second direct digital synthesizer into correspondence with the down-converted carrier signal, and a subtraction circuit for subtracting the respective counts in the input binary tune registers for the first and second direct digital synthesizers, which is a measure of the two way Doppler shift and vehicle speed.

2. A transportation communication system between an interrogator and a vehicle equipped with a transponder as specified in claim 1, wherein the interrogator includes first and second vertically spaced receiving systems, and means for selecting the stronger off the two return signals generated by the first and second vertically spaced receiving systems, to mitigate against fading effects caused by road multipath reflections.

3. A transportation communication system between an interrogator and a vehicle equipped with a transponder as specified in claim 1, wherein the interrogator further includes a processor producing coded data to be transmitted which is directed to said modulator which comprises a bi-phase modulator wherein the coded data is bi-phase shift key modulated onto the sine wave output, and a single sideband modulator which combines the output of the bi-phase modulator and the X-band signal.

4. A transportation communication system between an interrogator and a vehicle equipped with a transponder as specified in claim 1, wherein the transponder further includes an antenna, a mixer receiving the output of the antenna and the output of a local oscillator, for downconverting the received signal to produce an input for a Costas demodulator loop which replicates the suppressed interrogator carrier frequency, and also demodulates the bi-polar video baseband demodulation, including an upconverter, coupled to said local oscillator for upconverting the carrier lock frequency of the Costas demodulator loop to produce the same carrier frequency as the carrier entering the transponder, a bi-phase modulator for bi-phase modulating the output of a crystal oscillator with a desired transponder reply, and a single sideband modulator, and the transponder antenna transmits the resulting bi-phase shift key single sideband signal back to the interrogator.

5. A transportation communication system between an interrogator and a vehicle equipped with a transponder as specified in claim 1, wherein the output of the balanced mixer also includes bi-polar video representing the coded transponder reply message which is directed to a coherent phase detector, along with the output of the second direct digital synthesizer, for synchronous demodulation of the output of the balanced mixer, the output of which is directed to a bit synchronizer for bit synchronization, after which the bi-polar video is read as a corresponding stream of binary ones and zeros.

6. A transportation communication system between an interrogator and a vehicle equipped with a transponder as specified in claim 1, wherein the interrogator includes a stable clock which drives the first direct digital synthesizer, and the stable clock frequency samples the binary count in the input binary tune register at each clock pulse, and places the count in a digital phase accumulator which overflows when its n bits are full, and the length of time for the accumulator to overflow determines the period of one sine wave cycle, and thereby the resultant output frequency of the first direct digital synthesizer.

7. A transportation communication system between an interrogator and a vehicle equipped with a transponder as specified in claim 6, wherein the stable clock operates at a nominal frequency of 500–600 MHz, the direct digital synthesizer operates at a nominal frequency of 100–200 MHz, the multiplier operates at a nominal frequency of 8–9 GHz, and after the single sideband modulation, the interrogator carrier signal operates at a nominal frequency of 8–9 GHz.

8. A transportation communication system between an interrogator and a vehicle equipped with a transponder as specified in claim 3, wherein a bandpass filter filters the output of the single sideband modulator to remove sidebands generated in the modulation process.

9. A transportation communication system between an interrogator and a vehicle equipped with a transponder as specified in claim 1, wherein said processing circuit includes a series arrangement of a multiplier circuit, a filter circuit, and a division circuit, which strips the bi-phase shift key modulation while producing the doom-converted carrier signal.

10. A transportation communication system between an interrogator and a vehicle equipped with a transponder as specified in claim 1, wherein said control loop includes a low pass filter between the output of the phase detector and the input to the analog to digital converter, and the control loop is designed to be sufficiently fast to support loop closure in a fraction of a chip width, and the bandwidth of the low pass filter is selected to support loop closure in substantially less time than one pulse repetition interval.

11. A transportation communication system between an interrogator and a vehicle equipped with a transponder as specified in claim 1, wherein for a range measurement, a clock signal from the first direct digital synthesizer is directed to the processor to produce a count proportional to vehicle round trip delay and vehicle range.

12. A transportation communication system between an interrogator and a vehicle equipped with a transponder as specified in claim 4, wherein in the transponder, the local oscillator operates at approximately 8–9 GHz to produce an input of approximately 100–200 MHz.

* * * * *